United States Patent

[11] 3,585,913

[72] Inventor Karl Heinz Lange
   Bunde-Ennigloh, Westphalia, Germany
[21] Appl. No. 765,379
[22] Filed Oct. 7, 1968
[45] Patented June 22, 1971
[73] Assignee Balda Werke, Photographische Gerate und
   Kunststoff, R. Gruter
   Kommanditgesellschaft
   Bunde, (Westphalia), Germany
[32] Priority Oct. 9, 1967
[33] Germany
[31] P 12 67 967.5-51

[54] CAMERA WITH A COVER FOR PROTECTION OF OBJECTIVE AND OTHER ACTUATION ELEMENTS
10 Claims, 9 Drawing Figs.

[52] U.S. Cl. .................................................. 95/11,
   350/65
[51] Int. Cl. ................................................ G03b 11/04,
   G03b 17/02
[50] Field of Search ........................................ 95/11;
   350/65; 220/31, 31 S, 31 R

[56] References Cited
UNITED STATES PATENTS

| | | | |
|---|---|---|---|
| 2,245,197 | 6/1941 | Hughey .................... | 220/31 X |
| 2,681,600 | 6/1954 | Heidecke .................. | 95/11 |
| 2,725,804 | 12/1955 | Herzfeld ................... | 95/11 X |
| 3,443,497 | 5/1969 | Bihlmaier ................. | 95/11 |

Primary Examiner—Samuel S. Matthews
Assistant Examiner—Fred L. Braun
Attorney—Sparrow and Sparrow ABSTRACT: A camera provided with a hinged cover for protection of the objective and other elements. The cover has link pins for inserting the latter into a link bearing of the camera. The bearing has a gap at its circumference for inserting the link pins of the cover. When the link pins are inserted into the bearing, a movable supplement bearing part is released to automatically close the insert gap and thereby complete the hinge bearing. The movable bearing part can be shifted by hand against the action of a spring into an open position where it is locked, and the cover detachably removed from the bearing.

INVENTOR:
Karl Heinz Lange
By
Sparrow and Sparrow
Attorneys

INVENTOR:
Karl Heinz Lange
By
Sparrow and Sparrow
Attorneys

CAMERA WITH A COVER FOR PROTECTION OF OBJECTIVE AND OTHER ACTUATION ELEMENTS

BACKGROUND OF THE INVENTION

It is usual to enclose cameras when not in use in a protective housing in order to protect the objective and other actuation elements against damage. Cameras have been so constructed that at their bodies there is provided a correspondingly shaped protective cover overlapping the endangered parts and connected with the camera by a releasable hinge. The present invention relates to such a camera and is distinguished by a special simple arrangement together with inexpensive production.

SUMMARY OF THE INVENTION

According to the invention the protective cover is provided with link or bearing pins connected to it and insertable across to their axis into a link bearing of the camera body which can be opened at corresponding points and at inserting the pins release a lock liberating a movable bearing part which under spring pressure closes the insert gap automatically. The movable bearing part preferably constructed as a slide socket against the action of a spring can be shifted by hand into the open position where it is locked automatically, but at inserting the associated link pin is again released and shifted over the bearing pin to complete the hinge bearing.

At this construction of the coacting parts only one movement, namely the pressing-in of the link pins is necessary to make the hinge bearing operable for receiving the protective camera cover. Furthermore by means of the slides provided with corresponding fingergrip faces which can be gripped with two fingers and shifted together towards one another, the hinge can be opened easily, to liberate the bearing link pins and remove the protective camera cover.

Various further and more specific purposes, features and advantages will clearly appear from the detailed description given below taken in connection with the accompanying drawings which form part of this specification and illustrate merely by way of examples embodiments of the device of the invention.

BRIEF DESCRIPTION OF THE DRAWINGS

The figures show.

In the following description and in the claims, parts will be identified by specific names for convenience, but such names are intended to be as generic in their application to similar parts as the art will permit. Like reference characters denote like parts in the several figures of the drawings.

DESCRIPTION

Figure 8:
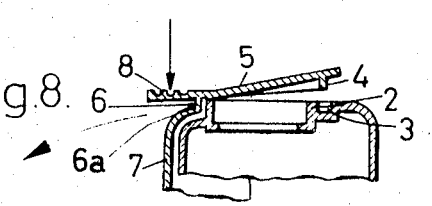
FIG. 8 a section through the locking lid with an adjacent receptacle for the flashcube socket in opened position.
Figure 9:
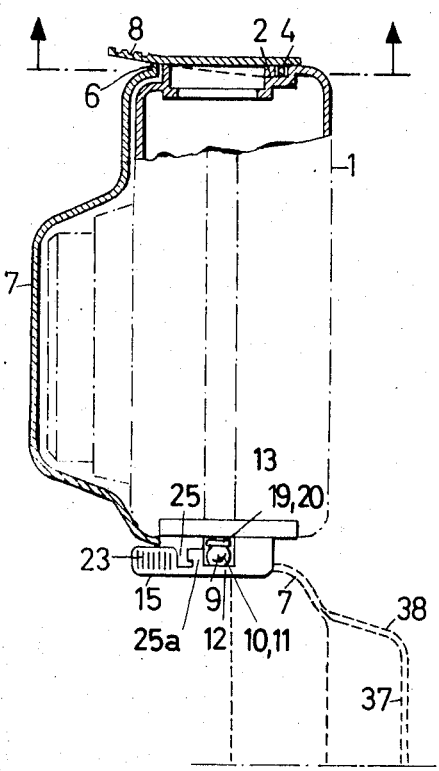
FIG. 9 a section through the protective cover with locking lid and hinge, partly in view at closed locking lid.

A housing 1 partly shown in dotted lines which preferably in its center is provided with a receptacle 2 (FIGS. 8, 9) for a flashlight cube (not shown in detail) which partly is surrounded by a notch 3. This notch is engaged by the rim 4 of a covering locking lid 5 which according to the invention integrally with a resilient web 6 and cover 7 pivotable and swingable down at point 9 preferably is produced of tough impact resistant plastics.

The resting edge 4 at closed protective-cover engages the notch 3 behind the receptacle 2 of the flashcube socket and by this locks the cover in its position. By pressing on the unlocking handle 8 of the locking lid 5 the resting edge 4 by lever action about point 6a is lifted out of the notch 3 against the natural spring action of the material and thereby cover 7 is unlocked so that it may swing about rotation point 9 thus rendering the camera ready for exposure.

Figure 1:
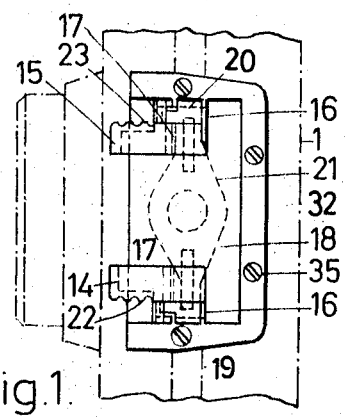
FIG. 1 is a plan view of the hinge housing attached to the camera with opened position of the slide socket for the protective camera cover.
Figure 2:
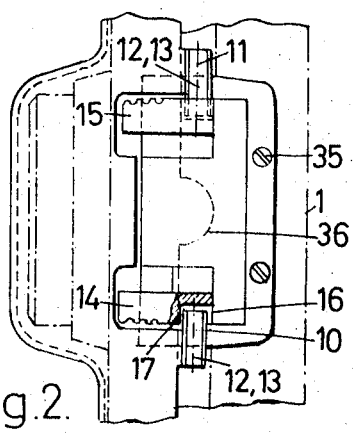
FIG. 2 a similar view as FIG. 1 at closed position of the slide socket.
Figure 3:
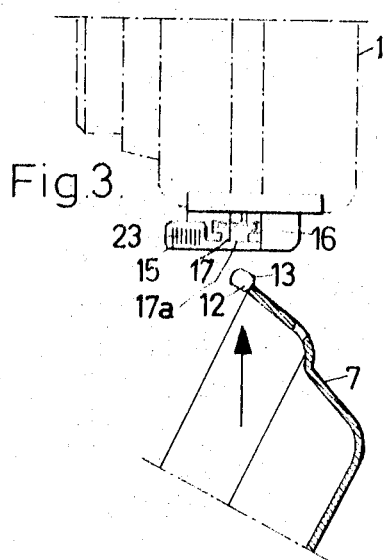
FIG. 3 a front view to FIG. 1.
Figure 4:
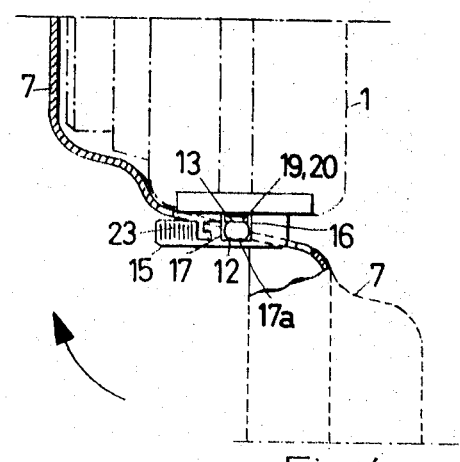
FIG. 4 a front view to FIG. 2.
Figure 6:
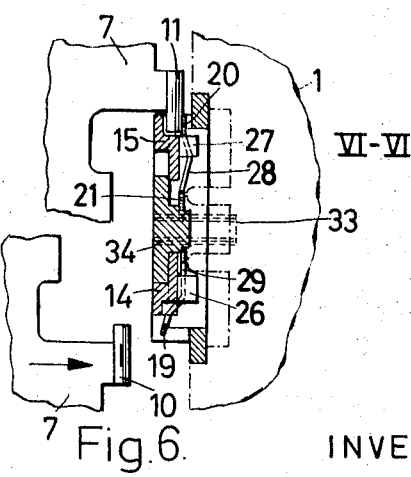
FIG. 6 a section along line VI–VI of FIG. 5.
Figure 7:
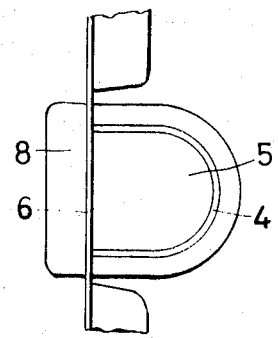
FIG. 7 a plan view of the locking lid.

The camera cover 7 is supported in point 9 by both the bearing pins 10 and 11 (FIGS. 2 and 9) and according to the invention these bearing pins 10, 11 are integral with the camera cover 7 and provided with each two key-faces 12 and 13 (FIG. 3). The bearings for bearing pins 10 and 11 of camera cover 7 are formed by slide socket 14 and 15 (shiftable against each other) (FIG. 4) beneath to the left by their walls 17 and 17a and to the right by the wall 16 of a hinge housing 18 serving as a slide socket support and above by the ends 19 and 20 of a leaf spring 21 (FIG. 6).

Figure 5:
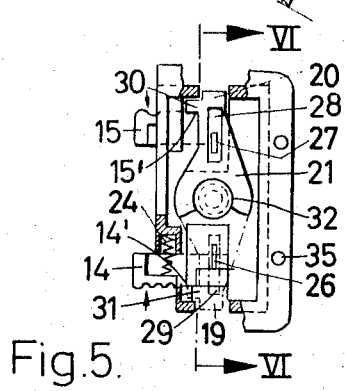
FIG. 5 the hinge housing with spring.

The slide sockets 14 and 15 for the camera cover 7 have fingergrip faces 22 and 23 at which they may be shifted manually inwardly against the action of pressure springs 24 (FIG. 5) in the area of the guiding notches 25 and guiding webs 25a of the hinge housing 18. Situated at the side of the slide sockets 14, 15 adjacent to the interior of the camera are bent over engaging noses 26 and 27 (FIGS. 5 and 6), engaging the slots 28 and 29 of leaf spring 21, these noses preventing a withdrawing of the slide sockets 14, 15 from the guiding notches 25 of the hinge housing 18. The leaf spring 21 furthermore is provided with rest-noses 30 and 31 (FIG. 5) which by pressing the slide sockets 14, 15 at the edges 14', 15' latch behind the latter, whereby simultaneously the ends 19, 20 of leaf spring 21 eject the cover 7 at the bearing pins 10, 11, so that the camera can be used without camera cover 7. By replacing the camera cover 7 the ends of leaf spring 19, 20 automatically are pressed down by the bearing pins 10, 11 and thereby the latch of the slide sockets is unlocked so that the latter can slide by the action of the pressure springs 24 on the guiding webs 25a over the bearing pins 10, 11 in order to form again a reliable, complete hinge bearing for the protective camera cover. The key faces 12 and 13 cause the cover 7 in operating position of the camera, if the cover is swung down, have a definite position.

The leaf spring 21 has a central opening 32 and preferably comprises a hollow pin 33 open to the exterior and in the interior provided with a drawn forward tripod-thread. The whole structure forms a unit positioned within the hinge housing 18 and is attachable by screws 35 on camera housing 1, with hollow pin 33 engaging a recess 36 of the camera housing.

The camera cover 7 conveniently is shaped only as a frame which for design purposes may be covered by an ornamental part 37, which may consist of suitable plastic secured on frame 7 and is covered together with the latter by foil 38.

What I claim is:

1. A camera comprising a housing and a flashcube receptacle thereon and having a cover for protecting the objective of said camera and other operable elements, said cover being attached to said camera at one side thereof by a combined hinge and latch structure constituting pivots rigidly attached to said cover, and pivot bearings having gaps for inserting said pivots, the latter being disposed for being inserted and removed into and out, respectively, of said bearings at a right angle to the axis of said pivots; bearing parts for closing said insertion gaps, spring means disposed for forcing said bearing parts into said closed position of said bearings, and locking means arresting said bearing parts in the open position of said bearings against the force of said spring means after removal of said pivots from said bearings; said locking means being disposed for reaching into said bearings for releasing said bearings parts and for locking said pivots in said bearings by said bearing parts closing said insertion gaps under the force of said spring means upon insertion of said pivots into said bearings.

2. A camera according to claim 1, said bearing parts consisting of slides for closing said gaps of said pivot bearings, and said spring means being disposed for applying a pressing force to said slides in the direction of closing said bearings, and finger gripping surfaces on said slides.

3. A camera according to claim 2, said slides constituting said bearing parts being mounted for sliding parallel to the axis of said pivot bearings.

4. A camera according to claim 1, said pivots being integral parts of said cover.

5. A camera according to claim 1, said cover having a locking lid, said lid having a resilient web connecting said lid with said cover, said locking lid having a rim, and a notch surrounding said flashcube receptacle on said housing, said rim disposed for engaging said notch in the closed position of said cover.

6. A camera comprising a cover for protecting the objective of said camera and other operable elements, said cover being attached to said camera at one side thereof by a combined hinge and latch structure constituting pivots rigidly attached to said cover and pivot bearings having gaps for inserting said pivots, the latter being disposed for being inserted and removed into and out, respectively, of said bearings at a right angle to the axis of said pivots; bearing parts for closing said insertion gaps, spring means disposed for forcing said bearing parts into said closed position of said bearings, locking means arresting said bearing parts in the open position of said bearings against the force of said spring means after removal of said pivots from said bearings, said locking means being disposed for reaching into said bearings and for coacting with said pivots upon insertion thereof into said bearings for releasing said bearing parts and for locking said pivots in said bearings by said bearing parts closing said insertion gaps under the force of said spring means, said bearing parts consisting of slides, said slides having wall parts and having locking edges, a hinge housing having guiding notches for said slides, a leaf spring having ends, said ends constituting id locking means, said leaf spring located in said housing, said ends extending into said pivot bearings, said bearings being formed by said hinge housing and said wall parts, said ends tending to eject said pivots, and rest noses on said ends which are disposed for engaging behind said locking edges in the open position of said slides, said rest noses furthermore being disposed for disengaging said locking edges for releasing said slides by pressing at said ends of said leaf spring by insertion of said pivots.

7. A camera according to claim 6, said slides having projections and said leaf spring having slots extending parallel to the axis of said pivot bearings, said slots being disposed for guiding and supporting said slides.

8. A camera according to claim 6, said leaf spring having a central opening and a hollow pin on said hinge housing, said pin having a thread tor a tripod.

9. A camera according to claim 8, said pivots of said cover having key faces securing a desired cover position in connection with said leaf spring in the open condition of said protecting cover of said camera.

10. A camera according to claim 6, said cover, said slides and said hinge housing consisting of a preferably tough, impact resisting plastic.